Sept. 20, 1971    B. F. McNAMEE    3,606,527
INTERMITTENT DRIVE FOR SURVEILLANCE CAMERA
Filed Feb. 17, 1969    2 Sheets-Sheet 2

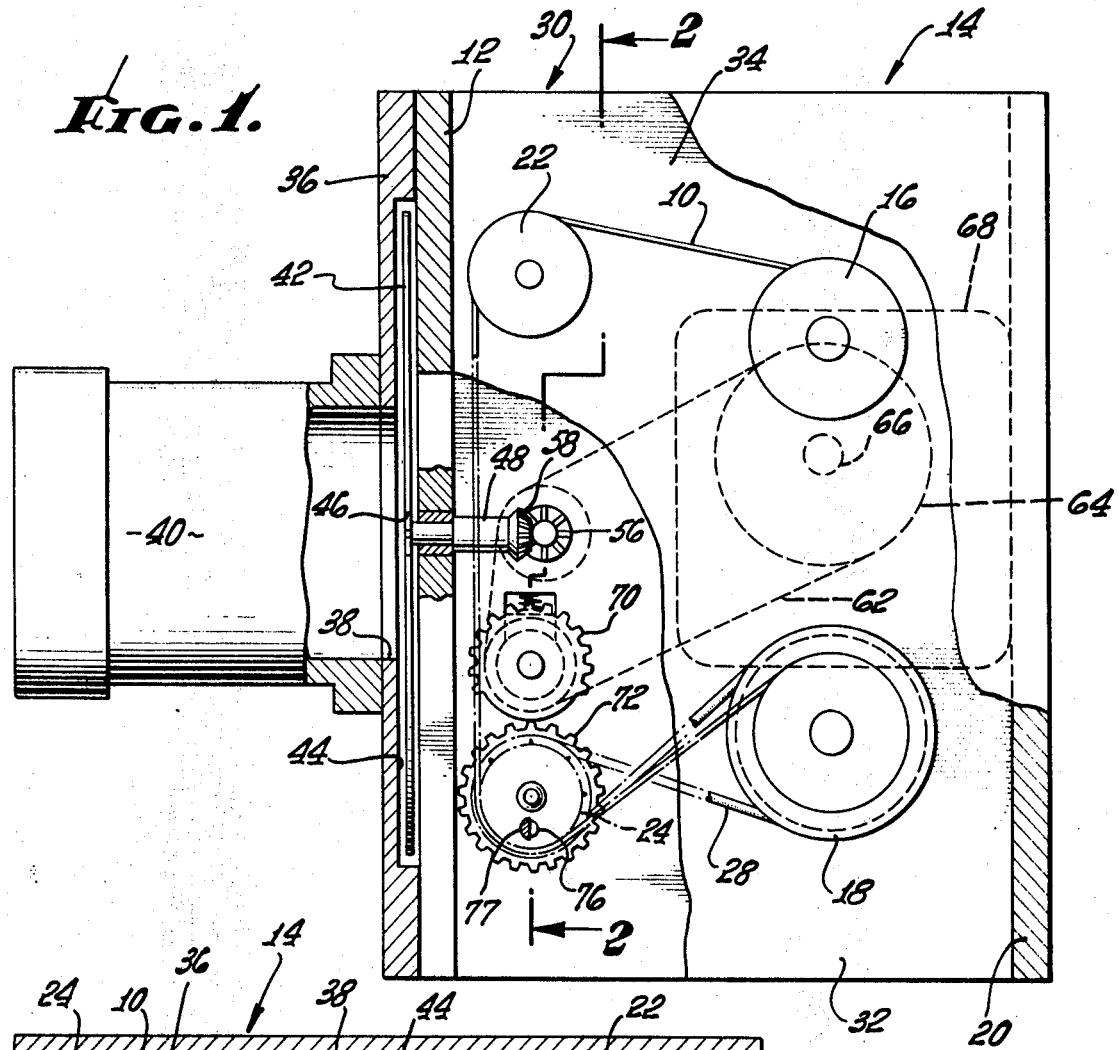
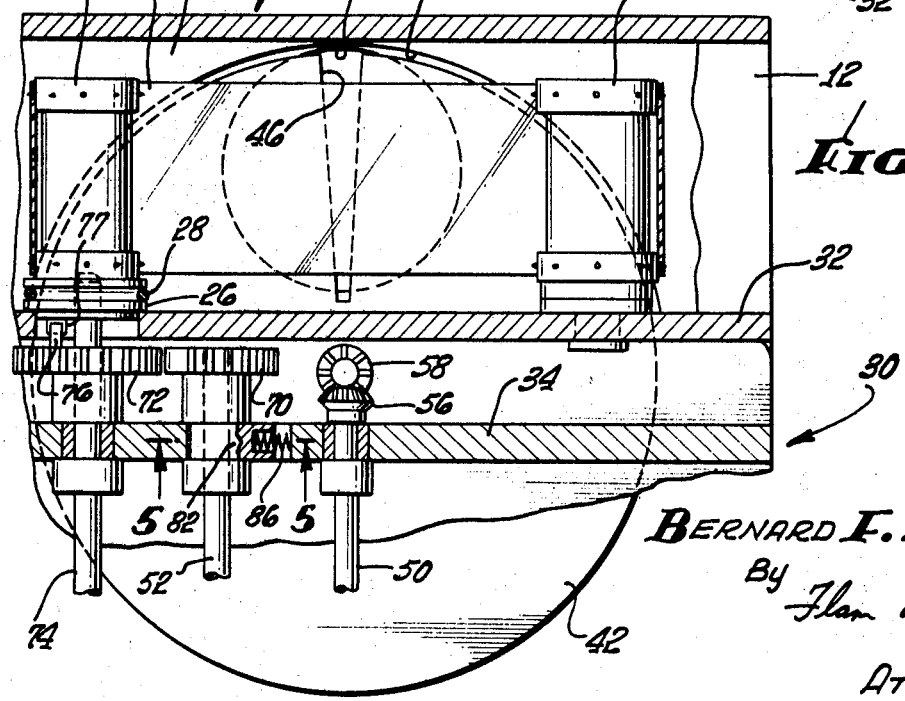

INVENTOR.
BERNARD F. McNAMEE
By Flam and Flam
ATTORNEYS.

United States Patent Office 3,606,527
Patented Sept. 20, 1971

3,606,527
INTERMITTENT DRIVE FOR SURVEILLANCE CAMERA
Bernard F. McNamee, Arcadia, Calif., assignor to
Dressen-Barnes Electronics Corp., Pasadena, Calif.
Filed Feb. 17, 1969, Ser. No. 799,651
Int. Cl. G03b 1/24
U.S. Cl. 352—190                    6 Claims

ABSTRACT OF THE DISCLOSURE

The surveillance camera when started takes a series of still pictures in relatively rapid progression. A continuously rotated shutter disc has a slit aperture in exposure position about one-third of the time. The film sprocket is advanced during the time when the shutter is closed by a simple gear mechanism. The driven gear connected to the sprocket is a complete gear and the driving gear synchronized with the shutter is a mutilated gear. A simple yielding mounting for the mutilated driving gear constitutes the sole means for ensuring proper meshing of the gears. A belt transmission between the sprocket and the takeup spool ensures against the imposition of any tension on the film during exposure that might cause a blurred image.

FIELD OF INVENTION

This invention relates to surveillance cameras such as used by banks for the purpose of obtaining photographs during burglaries or robberies for later identification purposes. Such cameras, of course, stay idle for long periods of time and are started by manual or semiautomatic means only in the event of a robbery or burglary. A 35 mm. cassette camera, designed to take pictures at the rate of about a frame a second for about five or ten minutes, has been found quite satisfactory. Only a modest length of film is required; hence, the camera is compact. There is ample opportunity for the subject or subjects to be photographed in a wide variety of camera address.

BACKGROUND OF THE INVENTION

Surveillance cameras of the type described are used primarily by banks and savings and loan associations. Yet such cameras can be used to advantage in many other types of establishments, such as gas stations or liquor stores, for purposes of apprehension of criminals and/or recovery of stolen property. Reliable surveillance cameras are rather complex and, accordingly, expensive. Even expensive surveillance cameras prove unreliable because the transmission fails when the camera is started or because the film slips when it is exposed.

One object of this invention is to provide a surveillance camera that has an intermittent motion device that is thoroughly reliable despite utmost simplicity. Another object of this invention is to provide a simple drive for the takeup spool in which its power source is physically disconnected during film exposure whereby no film slippage can then occur.

The intermittent motion device includes a mutilated drive gear mounted at the end of a shaft, with the shaft so supported that it can flex laterally at the region of the mutilated drive gear. The shaft is connected by suitable gears or sprocket chains to the shutter drive. The sprocket is driven by a full-toothed gear. At the end of the dwell period during which the film is exposed, the lead tooth of the mutilated gear immediately picks up the driven gear unless the crown of the lead tooth engages the crown of a tooth of the driven gear—an event that may on rare occasion happen. If this happens, the shaft flexes and the lead tooth of the mutilated gear slides past the blocking tooth of the driven gear and snaps immediately back into place to pick up the next tooth of the driven gear, all without stalling the drive motor. The only perceptible result in such circumstances is a slightly non-cumulative reduction in the spacing between the frame previously exposed and the frame about to be exposed. The motor does not stall.

The takeup spool is driven in dependent relationship to the film advance sprocket by a flexible pulley belt drive readily capable of slippage when film tension exceeds a certain value depending upon the belt tension and other factors. The takeup function is completed before the sprocket movement has terminated. When the sprocket movement terminates at the beginning of the dwell portion of the cycle, any tension imbalance in the pulley belt on opposite sides of the pulley carried by the drive sprocket is relieved or spent by a slight reverse movement of the drive sprocket and a corresponding elimination of all tension on that part of the film located at the focal plane well in advance of the beginning of film exposure.

This invention possesses many other advantages and has other objects which may be made more clearly apparent from a consideration of one embodiment of the invention. For this purpose, there is shown a form in the drawings accompanying and forming a part of the present specification, and which drawings are to scale. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIG. 1 is a top plan view of a surveillance camera incorporating the present invention, a portion of the camera being broken away and illustrated in section.

FIG. 2 is a fragmentary sectional view taken along a plane corresponding to line 2—2 of FIG. 1. The shutter is open in the position of parts shown in FIGS. 1 and 2.

DETAILED DESCRIPTION

Figure 3:
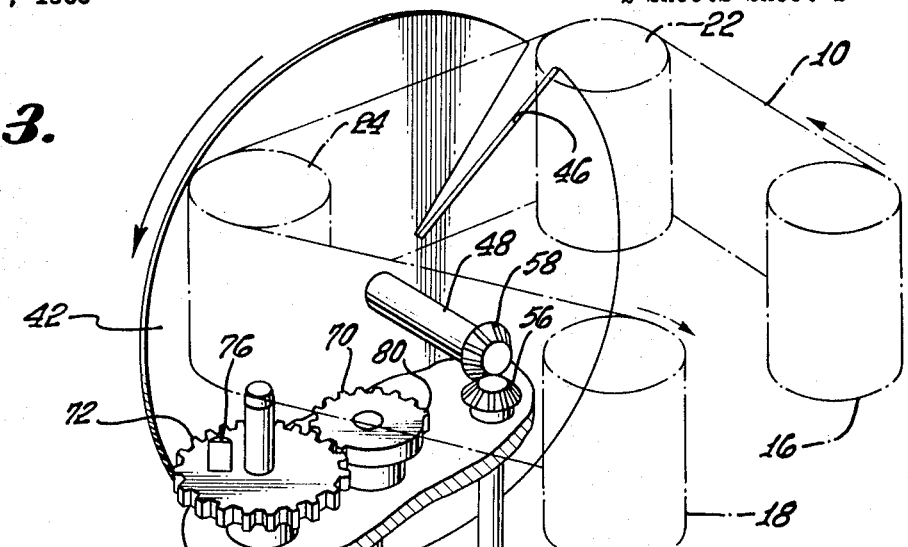
FIG. 3 is a pictorial view of the transmission elements for the drive sprocket shown in a position in which the movement of the drive sprocket is about to be completed and exposure of the film about to begin.

A strip or length of film 10 (FIG. 1) is supported for transport parallel to and along the inside of the frontal wall 12 of a generally rectangular cassette 4. A supply reel 16 and a takeup reel 18 are located near the rear wall 20 of the cassette. The film extends from the supply reel 16 around an idler wheel 22 located near the frontal wall 12 and then along the frontal wall 12 and about a sprocket wheel 24 to the takeup reel 18.

When the shutter is closed, the sprocket wheel 24 is intermittently moved, by means hereinafter to be described, to advance the film 10 by an amount substantially equal to the length of the frame when the shutter is closed. Angular movement of the sprocket wheel imparts angular movement to the take-up reel more than adequate to wind up the film. For this purpose, a pulley 26 (FIG. 2) is formed beneath the sprocket wheel 24 and a similar pulley is formed beneath the takeup wheel. A flexible belt 28 interconnects the pulleys with a drive ratio sufficient to take up the film. When the indexing movement of the sprocket wheel 24 is completed, it is freed so that any residual imbalance in tension between the runs of the belt 28 produces a slight reverse movement of the sprocket wheel 24. This ensures against the existence of any film tension, all in advance of the opening of the shutter. A usual spring-pressed plate or pad (not shown) keeps the film against the edges of an exposure opening (not shown) in the frontal cassette wall 12.

The cassette 14 detachably interfits a frame 30 that supports a drive mechanism. The cassette 14 drops into position so that its lower wall 32 (FIG. 2) overlies an upper bearing bracket 34 of the frame 30 and so that the frontal wall 12 of the cassette (FIG. 1) lies immediately behind an upwardly projecting wall 36 of the drive mechanism frame.

The exposure opening in the cassette frontal wall 12 registers with an opening 38 in the frame wall 36 at which a lens assembly 40 is mounted. A shutter disc 42 is interposed between these openings. The upper portion of the disc 42 is accommodated in a shallow recess 44 in the frame wall 36. The axis of the disc is located in the space between the lower wall 32 of the cassette 14 and the bearing bracket 34 of the frame. The disc 42 has a narrow slit 46 (FIG. 2) that sweeps past the aligned lens opening for appropriate film exposure. For this purpose, a shaft 48 mounts the disc on the frame 30.

Figure 4:
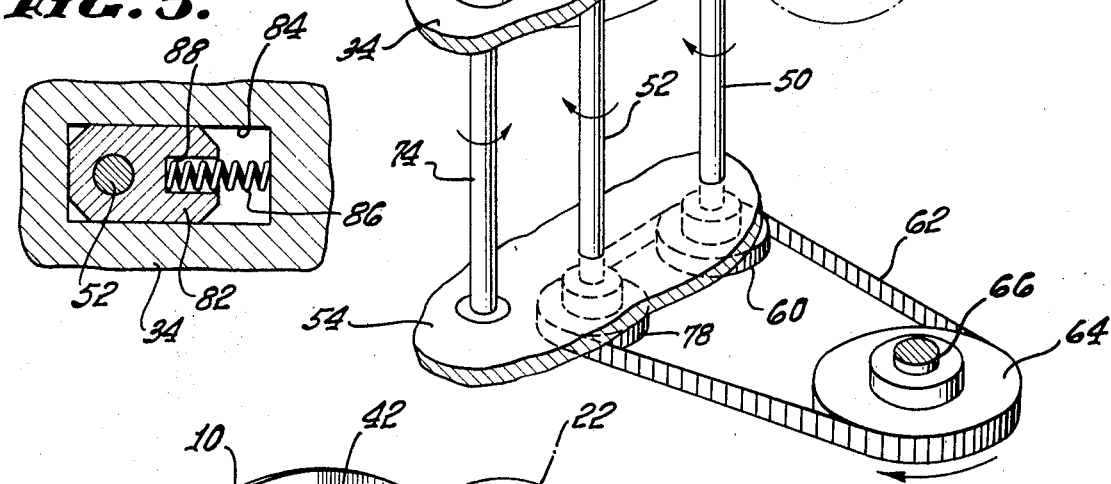
FIG. 4 is a pictorial view similar to FIG. 3, but showing the parts in a position in which exposure of the film has been completed and movement of the drive sprocket about to begin.

The drive mechanism for the shutter disc and the sprocket wheel 24 is shown in FIGS. 3 and 4. A drive shaft 50 for the shutter disc and a drive shaft 52 for the sprocket wheel are supported in spaced parallel relationship. The drive shafts 50 and 52 both project above the upper bearing bracket 34 and below a lower bearing bracket 54 of the frame. The brackets 34 and 54 carry simple sleeve bearings for supporting the drive shaft 50. The upper projecting end of the drive shaft 50 is coupled to the shutter disc shaft 48 through bevel gears 56 and 58. The lower projecting end of the drive shaft 50 carries a sprocket wheel 60 engaged by a sprocket chain 62. A driving sprocket wheel 64 is carried on the shaft 66 of an electric motor 68 (FIG. 1).

The drive shaft 52 for the film advance sprocket carries an interrupted gear 70 (FIGS. 3 and 4) that meshes with a full-toothed gear 72 coupled to the film advance sprocket. The full-toothed gear 72 is mounted on a shaft 74 and the ends of which are supported by simple sleeve bearings mounted in the bearing brackets 34 and 54. The sprocket wheel in the cassette 14 is coupled to the gear 72 by the aid of a pin 76 projecting upwardly from the gear 72. A companion pin 77 (FIG. 2) projects downwardly from a pulley 26 to be in the path of orbital movement of the pin 76. The upper end of the shaft 74 for the full-toothed gear fits into a piloting aperture in the sprocket wheel 24 as the cassette is dropped into position.

The lower end of the drive shaft 52 for the mutilated gear 70 is supported by a sleeve bearing in the lower bracket plate 54, and the end of the shaft beneath the bracket plate 54 carries a sprocket wheel 78 also engaged by the sprocket chain 62 to achieve position synchronism between the shafts. The sprocket wheels 60 and 78 have the same number of teeth; hence, the mutilated gear 70 rotates once for each revolution of the shutter disc 42. In the position shown in FIG. 3, the mutilated gear 70 is about to commence the dwell portion of the cycle as the shutter slit 46 begins its traverse past the lens opening. In the position shown in FIG. 4, the slit 46 has completed its traverse and the lead tooth 80 picks up a tooth of the full-toothed wheel 72. The film advance sprocket is accordingly moved while the shutter is closed.

The pins 76 and 77 may allow a certain lost motion when the camera motor is first started, resulting in a partial double exposure of the first two frames only. The pins have their ends oppositely beveled in order to ensure against jamming should the pins happen to be angularly aligned when the cassette is positioned. In such event, a cam action rotates the pins apart.

Figure 5:
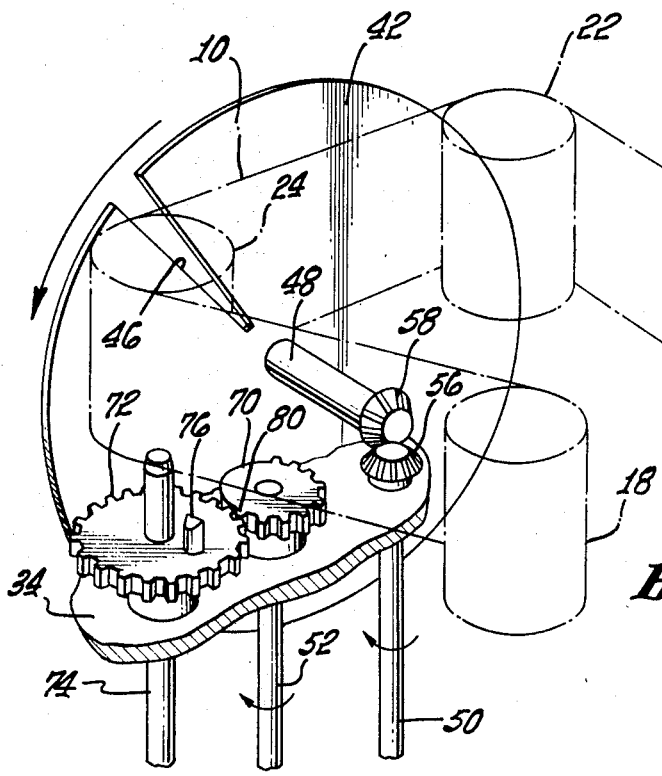
FIG. 5 is an enlarged fragmentary sectional view taken along a plane corresponding to line 5—5 of FIG. 2.

It is possible that the lead tooth 80 of the mutilated gear 70, instead of falling into the trough between the teeth of the full-toothed gear 72, engages the crown of the tooth. This might ordinarily stall the motor, resulting in a total or partial operational failure of the camera, depending upon how many cycles occurred prior to the jamming of the gear members. To prevent such failure, the mutilated gear is permitted lateral movement away from the full-toothed gear 72. For this purpose, the shaft 52 projects through a bearing block 82 (FIGS. 2 and 5) that is mounted in a recess 84 in the bearing bracket 34 for sliding movement radially toward and away from the full-toothed gear 72. A compression spring 86 is seated in a recess 88 in the bearing block 82 to urge the shaft 52 and mutilated gear 70 toward the full-toothed gear. The end of the recess 84 limits return movement of the shaft 52. In the limited position, the gears 70 and 72 are located so that their pitch circles are tangent. The shaft 52 is long enough so that the bearing at the lower end need have no special provisions to allow the slight lateral flexure of the shaft at the upper end. In the event of a crown-to-crown engagement, the drive motor continues without overload; the mutilated gear moves laterally against the force of the spring 86 as it moves angularly; and almost immediately the mutilated gear snaps back into proper driving engagement with the full-toothed gear. The full-toothed gear 72 is of conventional construction.

Instead of the spring 86, lateral resilient flexure could instead be provided by suitable spring characteristics of the material of the shaft 52 itself, with the mutilated gear located sufficiently far distant from the shaft bearing or bearings.

I claim:

1. In a surveillance camera: a shutter mechanism; a film transport mechanism; a common selectively operable motor for both said mechanisms; means coupling said shutter mechanism to said motor for continuous operation of said shutter mechanism thereby; said shutter mechanism having a cycle including a closed portion and an open portion; means coupling said film transport mechanism to said motor for interrupted operation of said film transport mechanism thereby, including a full-toothed gear connected to said film transport mechanism; a mutilated gear, means connecting said mutilated gear to said motor for continuous operation thereby in position and speed synchronism with said shutter mechanism, means mounting said mutilated gear for interrupted engagement with said full-toothed gear, said mounting means including means to allow movement of said mutilated gear so that the distance between the axes of said gears is variable, said mounting means including means determining a normal minimum distance between said axes and to thereby keep said gears out of contact when the toothless portion of said mutilated gear is juxtaposed to said full-toothed gear, and mounting means including means to resiliently resist yielding movement of said mutilated gear away from said full-toothed gear.

2. The combination as set forth in claim 1 in which said full-toothed gear is free to move angularly when said mutilated gear has its dwell portion opposite said full-toothed gear whereby tension in said film transport mechanism is relieved when said dwell portion is opposite.

3. The combination as set forth in claim 1 in which said mounting means includes an elongate shaft firmly supported at only one end, said connecting means being located adjacent said one end, said mutilated gear being mounted at the other end of said shaft.

4. The combination as set forth in claim 1 in which said mounting means includes an elongate shaft; said mutilated gear being mounted at one end of said shaft; first bearing means supporting the other end of said shaft and located in fixed relationship to the axis of said full-toothed gear; second bearing means supporting the other end of said shaft; said second bearing means being guided for movement radially away from said full-toothed gear and spring pressed toward said full-toothed gear.

5. The combination as set forth in claim 1 in which said film transport mechanism includes a sprocket wheel, a takeup reel, pulleys respectively connected to said sprocket wheel and takeup reel and a belt interconnecting said pulleys; said sprocket wheel being connected to said full-toothed gear; said belt being capable of slippage upon the existence of excess opposing film tension.

6. The combination as set forth in claim 1 in which said film transport mechanism includes a sprocket wheel, a takeup reel, pulleys respectively connected to said sprocket wheel and takeup reel and a belt interconnecting said pulleys; said sprocket wheel being connected to said full-toothed gear; said belt being capable of slippage upon the existence of excess opposing film tension; said full-toothed gear being free to move angularly when said mutilated gear has its dwell portion opposite said full-toothed gear whereby tension in said film transport mechanism is relieved when said dwell portion is opposite.

References Cited

UNITED STATES PATENTS

| | | | |
|---|---|---|---|
| 2,520,296 | 8/1950 | Williams | 352—187 |
| 3,101,586 | 8/1963 | Polonsky | 74—435 |
| 3,448,227 | 6/1969 | Balchunas | 74—411 |

FOREIGN PATENTS

| | | | |
|---|---|---|---|
| 13,920 | 6/1912 | Great Britain | 352—190 |

LOUIS R. PRINCE, Primary Examiner

D. E. CORR, Assistant Examiner